US012760752B2

(12) United States Patent
Le Flao et al.

(10) Patent No.: US 12,760,752 B2
(45) Date of Patent: Oct. 13, 2026

(54) MODULE FORMING A MECHANICAL ACTUATOR OF THE MUSCLE OR FLUIDIC BLADDER TYPE, CORRESPONDING SYSTEM AND METHOD OF USE

(71) Applicant: BZ BOTS, Breal-sous-Montfort (FR)

(72) Inventors: Vincent Le Flao, Mordelles (FR); Matthieu Merle, Liffre (FR)

(73) Assignee: BZ BOTS, Breal-sous-Montfort (FR)

( * ) Notice: Subject to any disclaimer, the term of this patent is extended or adjusted under 35 U.S.C. 154(b) by 64 days.

(21) Appl. No.: 18/998,451

(22) PCT Filed: Jul. 6, 2023

(86) PCT No.: PCT/EP2023/068802
§ 371 (c)(1),
(2) Date: Jan. 24, 2025

(87) PCT Pub. No.: WO2024/022785
PCT Pub. Date: Feb. 1, 2024

(65) Prior Publication Data

US 2026/0185547 A1 Jul. 2, 2026

(30) Foreign Application Priority Data

Jul. 26, 2022 (FR) ....................................... 2207693

(51) Int. Cl.
*F15B 15/10* (2006.01)
*F15B 11/18* (2006.01)
(Continued)

(52) U.S. Cl.
CPC .......... *F15B 15/103* (2013.01); *F15B 11/183* (2013.01); *F15B 15/262* (2013.01); *F16L 55/34* (2013.01); *F15B 2215/30* (2013.01)

(58) Field of Classification Search
CPC ........ F15B 11/18; F15B 11/183; F15B 15/10; F15B 15/103; F15B 15/262; F16L 55/34
See application file for complete search history.

(56) References Cited

U.S. PATENT DOCUMENTS 4,077,080 A 3/1978 Ross
4,372,161 A * 2/1983 de Buda ................ F16L 55/44 254/134.6
(Continued)

FOREIGN PATENT DOCUMENTS

CN 101306535 A 11/2008
CN 203532401 U 4/2014
(Continued)

OTHER PUBLICATIONS

International Search Report dated Sep. 18, 2023 for corresponding International Application No. PCT/EP2023/068802, filed Jul. 6, 2023.
(Continued)

*Primary Examiner* — Michael Leslie
(74) *Attorney, Agent, or Firm* — David D. Brush; Westman, Champlin & Koehler, P.A.

(57) ABSTRACT

A module forming a mechanical actuator of the muscle or fluidic bladder type, capable of being used on a robot. The module includes: first and second sealed end couplings/connectors provided with fluid supply/circulation elements; and a flexible shell/membrane arranged between the first and second end couplings. The flexible shell is capable of deforming between an inflated state, when an inflation fluid is introduced into the shell, and a deflated state, when the inflation fluid is discharged/removed from the shell. Passage of the shell from one state to the other transmits/applies a force and/or a translational movement. At least one flexible sheath in the form of a tube is arranged inside the shell and opens at the end connectors, providing a passage extending
(Continued)

longitudinally through the module. The flexible sheath is fluid-tight and forms, with the shell and the end connectors, an inflation chamber into which the inflation fluid is introduced.

14 Claims, 11 Drawing Sheets

(51) Int. Cl.
*F15B 15/26* (2006.01)
*F16L 55/34* (2006.01)

(56) References Cited

U.S. PATENT DOCUMENTS

| | | | | | |
|---|---|---|---|---|---|
| 4,526,086 | A * | 7/1985 | Holton | F15B 11/18 91/44 |
| 4,848,168 | A * | 7/1989 | Negishi | F16L 55/28 92/92 |
| 5,067,390 | A * | 11/1991 | Negishi | F15B 15/103 92/92 |
| 5,144,848 | A * | 9/1992 | Uenishi | G02B 6/52 600/116 |
| 5,165,323 | A * | 11/1992 | Sato | F15B 15/103 92/92 |
| 5,601,025 | A * | 2/1997 | Box | F16L 55/34 104/138.2 |
| 6,347,674 | B1 * | 2/2002 | Bloom | E21B 33/127 175/98 |
| 6,478,097 | B2 | 11/2002 | Bloom et al. | |
| 8,573,889 | B2 | 11/2013 | Bauer | |
| 9,427,143 | B2 * | 8/2016 | Glozman | F16L 55/34 |
| 9,962,746 | B2 | 5/2018 | Bauer et al. | |
| 10,473,215 | B2 * | 11/2019 | Landberg | F16J 3/046 |
| 12,521,870 | B2 * | 1/2026 | Lathrop | B25J 9/1075 |

FOREIGN PATENT DOCUMENTS

| | | | |
|---|---|---|---|
| CN | 204450576 | U | 7/2015 |
| CN | 104842369 | A | 8/2015 |
| CN | 103253368 | B | 12/2015 |
| CN | 205956106 | U | 2/2017 |
| CN | 105030389 | B | 3/2017 |
| CN | 206393634 | U | 8/2017 |
| CN | 105805076 | B | 11/2017 |
| CN | 105856219 | B | 11/2017 |
| CN | 105666484 | B | 12/2017 |
| CN | 206738285 | U | 12/2017 |
| CN | 106837913 | B | 5/2018 |
| CN | 106426146 | B | 10/2018 |
| CN | 110370257 | A | 10/2019 |
| CN | 110645444 | A | 1/2020 |
| CN | 110877331 | A | 3/2020 |
| CN | 210452730 | U | 5/2020 |
| CN | 109895066 | B | 9/2020 |
| CN | 212203603 | U | 12/2020 |
| CN | 110509266 | B | 5/2021 |
| CN | 113084789 | A | 7/2021 |
| DE | 19815579 | C1 | 7/1999 |
| DE | 19745497 | C2 | 1/2000 |
| DE | 10035221 | C2 | 8/2002 |
| DE | 10042489 | C2 | 10/2002 |
| DE | 10118217 | C2 | 2/2003 |
| DE | 10142088 | C1 | 4/2003 |
| DE | 20217805 | U1 | 4/2003 |
| DE | 10204776 | C1 | 7/2003 |
| DE | 10156069 | C2 | 10/2003 |
| DE | 102004023175 | B3 | 12/2005 |
| DE | 102004058315 | B3 | 6/2006 |
| DE | 10251823 | B4 | 4/2007 |
| DE | 202011002603 | U1 | 4/2011 |
| DE | 102008008296 | B4 | 12/2012 |
| DE | 202014105354 | U1 | 11/2014 |
| DE | 102014104504 | A1 | 10/2015 |
| DE | 202017102162 | U1 | 5/2017 |
| EP | 1450095 | A1 | 8/2004 |
| EP | 1727493 | B1 | 4/2010 |
| EP | 3203132 | A1 | 8/2017 |
| EP | 3228807 | B1 | 5/2019 |
| EP | 3017885 | B1 | 4/2020 |
| EP | 3243576 | B1 | 9/2021 |
| FR | 2647527 | A1 | 11/1990 |
| FR | 2700810 | A3 | 7/1994 |
| JP | 354049594 | A | 4/1979 |
| JP | 6636264 | B2 | 1/2020 |
| KR | 101639520 | B1 | 7/2016 |
| KR | 102195048 | B1 | 12/2020 |

OTHER PUBLICATIONS

Written Opinion of the International Searching Authority dated Sep. 18, 2023 for corresponding International Application No. PCT/EP2023/068802, filed Jul. 6, 2023.

English translation of the Written Opinion of the International Searching Authority dated Oct. 29, 2024 for corresponding International Application No. PCT/EP2023/068802, filed Jul. 6, 2023.

French Search Report and Written Opinion dated Feb. 15, 2023 for corresponding French Application No. 2207693, filed Jul. 26, 2022.

* cited by examiner

MODULE FORMING A MECHANICAL ACTUATOR OF THE MUSCLE OR FLUIDIC BLADDER TYPE, CORRESPONDING SYSTEM AND METHOD OF USE

CROSS-REFERENCE TO RELATED APPLICATIONS

This Application is a Section 371 National Stage Application of International Application No. PCT/EP2023/068802, filed Jul. 6, 2023, and published as WO/2024/022785 A1 on Feb. 1, 2024, not in English, which claims priority to and the benefit of French Patent Application No. 2207693, filed Jul. 26, 2022, the contents of which are incorporated herein by reference in their entireties.

FIELD OF THE INVENTION

The field of the invention is that of robotics applied to industrial fields such as the automotive industry, the plastics industry, etc.

In particular, the invention is particularly suited to robotics applied to pipes. Such robots are used, for example, to carry out obstacle clearing and rehabilitation tasks within pipes. The invention is also suited for pumping viscous fluids and for pulling cables.

PRIOR ART

In the field of actuators, and more particularly for robotics, pneumatic or hydraulic cylinders are known which allow transmitting a translational movement and/or a force thanks to pneumatic or hydraulic energy.

These actuator cylinders, with a simple design, are relatively efficient and reliable in their operation. Nonetheless, these actuator cylinders are rigid devices which cannot be used in all fields or environments, and in particular in pipes with a small diameter and/or which have elbows.

Another drawback of these so-called “conventional” actuator cylinder is that, when used in pipes, they are difficult to implement with other devices, tools or equipment, in particular electric or electronic equipment necessary for the operations to be performed.

In order to overcome at least some of these drawbacks, pneumatic muscles and bladders that are flexible and deform to transmit a translational movement, generally by pulling for muscles and by pushing for bladders, are known.

FIG. 1 illustrates an example of a known pneumatic muscle 9. Such a muscle 9 comprises a flexible membrane 91 arranged between two end couplings, or connectors 92. Each of the end couplings 92 has a fluid supply orifice 93 allowing injecting and drawing the fluid inside the membrane 91.

Depending on the structure of the membrane 91, the device retracts axially (muscle) or expands axially (bladder).

A membrane not reinforced with fibres to prevent elongation thereof during inflation allows making a bladder that expands axially during inflation.

A fibre-reinforced membrane so as to prevent elongation of this membrane during inflation allows making a muscle that shrinks axially during inflation.

During the introduction of the fluid into the membrane 91, the latter expands diametrically/transversely and shrinks axially to switch from an elongated state into a retracted state. This change of state allows carrying out a pull function by application of a translational movement during shrinkage of the muscle.

For a bladder, during the introduction of the fluid into the membrane 91, the diametric/transverse expansion is limited and the membrane extends axially to switch from a retracted state into an expanded state. This change of state allows carrying out a pushing function by application of a translational movement during the elongation of the bladder.

Muscles and bladders are flexible when they are not inflated and more rigid once inflated The drawback of this type of fluidic muscles and bladders, in a robotic application requiring a power transmission, for example to carry out a milling action, lies in the fact that they do not enable this power transmission directly to the tool located downstream of the system. Thus, the tool or the piece of equipment implemented at the downstream end of the system to carry out the milling function requires a power conversion, which generally implements an electric, hydraulic or pneumatic motor to transmit power to the tool/piece of equipment. Such a power conversion device has a relatively large size which results in substantially limiting the power of these systems when used in environments with small dimensions and/or having elbows.

If we focus on the field of pipe robots, and in particular on the advance function in a pipe, systems are known implementing an inflatable system having a body divided into a plurality pneumatically inflatable sections. These systems enable the passage of elbows. When the different inflatable sections are inflated according to particular sequences, these systems could be used to lock a position or make the robot advance in the pipe.

A drawback of these systems is that many electric cables and/or pneumatic or hydraulic hoses cross them to convey power and signals to the forward operating portion of these robots, they are therefore relatively difficult and expensive to maintain, in particular when one of the inflatable sections is deteriorated or exploded. Therefore, the operations of maintenance of these systems require the intervention of a specialised operator, generating a high cost and a considerable operation delay during which the system is unavailable.

Hence, there is a need to provide a new solution which allows providing an actuator in the form of a fluidic muscle or bladder which, in addition to an axial movement transmission, allows carrying out a power transmission directly from the source upstream of the device to the downstream operating portion, without resorting to a power conversion device such as pneumatic, hydraulic or electric motors, for example.

Another objective of the invention, in at least one embodiment, is also to provide a modular solution enabling the assembly of several inflatable modules, independent of each other for example, so as to ensure different movement and power transmission functions and to facilitate the maintenance of complex systems formed by several ones of these modules.

Another objective of the invention, in at least one embodiment, is also to carry out the transmission of pulling and/or pushing movements of the muscle or bladder modules of a module towards at least one other next module in order to obtain complex mechanical functions, such as an angular tilting, a transformation of translational movement into a rotational motion, or a composition of movement within a reduced bulk.

Another objective of the invention, in at least one embodiment, is also to be able to carry out all of these functions while preserving the known properties of variable flexibility of the muscles and bladders to deal with the passage of bends or obstacles.

Another objective of the invention, in at least one embodiment, is to be able to allow conveying and/or pumping fluids, and in particular viscous fluids, directly through the muscle and bladders of this new type.

Another objective of the invention, in at least one embodiment, is to transmit the axial translational movement generated by the inflation of the external membrane to the internal sheath and to the accessories that it could contain in order to make a module for pulling the accessory by pinching it. Such a function may be obtained by the deformation of the internal sheath under the pressure of the inflation chamber of the muscle or bladder One object of the present invention primarily relates to reinforced membrane muscles characterised by an axial shrinkage during the inflation (muscle). Nonetheless, the principle of the invention could also be applied to axially expanding bladders (bladder).

SUMMARY OF THE INVENTION

The technique of the invention allows solving at least some of the drawbacks raised by the prior art. More specifically, the invention relates to a module, forming a mechanical actuator of the muscle or fluidic bladder type, capable in particular of being implemented on a robot, said module comprising:

- first and second sealed end couplings, or connectors provided with fluid supply or circulation means,
- a flexible shell, or membrane arranged between said first and second end couplings, said flexible shell being capable of deforming between an inflated state, of the module, when an inflation fluid is introduced into said shell, and a deflated state, when said inflation fluid is discharged/removed from said shell, the switch from one state into another of said shell transmitting/applying a force and/or a translational movement of the first end coupling relative to the second end coupling;

According to the invention, said module comprises at least one flexible sheath in the form of a tube, arranged inside said shell and opening at the end connectors, forming at least one through-passage extending longitudinally through said module. Said flexible sheath is fluid-tight and forms, with said shell and said end connectors, an inflation chamber into which said inflation fluid is introduced,

- said at least one flexible sheath being in the form of a corrugated hose to allow said module, in the deflated state of the flexible shell, to bend to allow the passage of pipe elbows,
- said module comprises at least one auxiliary sleeve arranged between said first and second end couplings and extending into said shell.

Hence, the invention provides a new actuator solution substantially in the form of a fluidic, for example pneumatic or hydraulic, muscle or bladder, which may be flexible, in a deflated state, so as to enable the passage of elbows in pipes for example, and which may be rigid, in an inflated state.

Hence, the use of a flexible sheath enables the module to deform when it is in the elongated position so as, in particular, to enable the passage of elbows when it is used in pipes.

Furthermore, the switch of the module from the deflated state into the inflated state (and vice versa) allows in particular transmitting a pulling or pushing force and/or translational movement.

The invention also provides a through-passage which extends throughout the module and which enables the passage of accessories or pieces of equipment or fluids inside/through the module. For example, this through-passage may allow receiving a torsion cable transmitting a high power, without any power conversion, so as to directly rotate a tool, for example.

According to a particular aspect of the invention, said at least one sheath is configured to resist the pressure of said fluid when the latter is injected into said chamber.

Thus, the sheath does not crush or deform radially under the effect of the fluid injected into the inflation chamber. This allows protecting any element, accessory or equipment received in the through-passage.

According to another particular aspect of the invention, said through-passage is configured to receive at least one accessory element fixed or movable in translation and/or in rotation.

According to still another particular aspect of the invention, said accessory element is selected from among:

- a rotary torsion cable capable of transmitting power to a tool;
- a high-pressure or very-high-pressure hydraulic hose;
- a pneumatic hose;
- an electric power supply cable;
- a data transmission cable;
- a mechanical pull cable;
- a rigid or flexible axis which may be fixed or rotary,
- a push element of another module; or
- a combination thereof.

Alternatively, it is possible to directly pass a fluid within the sheath instead of the accessory element.

Thus, thanks to the through-passage formed within the module, the invention allows receiving, and even passing, at least one accessory element. Depending on the received accessory element, it is possible to transmit power, data, a force, a movement, etc.

The through-passage is particularly suited to receive a rotary torsion cable capable of transmitting power to a tool. Such a cable allows doing without the use of a motor (electric, hydraulic or pneumatic) integrated into the system, in accordance with the solutions of the prior art. Such a cable then allows providing a higher power for an identical or reduced bulk.

According to a particular aspect of the invention, said through-passage is configured to receive an incompressible push element, said push element being fixed at least in translation with respect to one of said end couplings and movable at least in translation through the other one of said end coupling so as to transmit a translational movement and/or a force when switching from one state into another of said shell.

The implementation of a push element enables the module to transmit a pushing force and/or translational movement, i.e. forwards, which is not possible with a conventional pneumatic muscle as described in the prior art.

Thus, the module of the invention allows providing an alternative solution to an actuator cylinder, also offering flexibility, for example to passing elbows in pipes, when the module is in the elongated position.

According to another particular aspect of the invention, said incompressible push element is hollow so as to have a central passage, said central passage being configured to receive said at least one accessory element.

In this manner, at least one accessory element could be received through the module, as detailed before.

According to a particular aspect of the invention, said sheath is incompressible, said sheath being mounted fixed at least in translation with respect to one of said end couplings and mounted movable at least in translation through the other one of said end couplings so as to transmit a translational movement and/or a force when switching from one state to another of said shell.

This variant proposes refraining from using an incompressible push element, by directly implementing an incompressible sheath that is movable in translation relative to end couplings. In this manner, the sheath is capable of transmitting a pushing force and/or translational movement.

According to another particular aspect of the invention, said end coupling on which said incompressible sheath is mounted at least movable in translation comprises sealing means at said end coupling cooperating with said sheath.

Thus, the sealing means enable the sheath to form the inflation chamber, together with the shell and the end couplings.

According to a particular aspect of the invention, said module comprises at least one intermediate element clasping said shell and said at least one flexible sheath, said at least one intermediate element forming an element for guiding said flexible sheath when switching from one state into another of said shell.

Such an intermediate element is particularly suitable for modules with large lengths which might buckle during the change in position of the module. It allows clamping the shell while guiding the sheath.

According to a particular aspect of the invention, auxiliary sleeve(s) allow(s) receiving additional accessories or pieces of equipment through the module.

According to another particular aspect of the invention, the at least one auxiliary sleeve is configured to receive or form at least one among:

- a rotary torsion cable, capable of transmitting a power to a tool;
- a high-pressure or very-high-pressure hydraulic hose;
- a pneumatic hose;
- an electric power supply cable;
- a data transmission cable;
- a mechanical pull cable;
- a combination thereof.

According to a particular aspect of the invention, the module comprises a flexible sheath extending coaxially with the longitudinal axis of said module and at least one auxiliary sleeve arranged between said sheath and said shell.

According to another particular aspect of the invention, the module comprises a flexible sheath extending coaxially with the longitudinal axis of said module and at least two auxiliary sleeves arranged equidistant from each other between and with respect to said sheath.

According to still another particular aspect of the invention, the module comprises three auxiliary sleeves arranged between said sheath and said shell according to an equilateral triangle arrangement.

Such a configuration may be used to control, by acting on mechanical pull cables arranged in said auxiliary sleeves, the orientation of the front end of the module, for example carrying a tool.

According to a particular aspect of the invention, the module comprises a flexible sheath extending eccentrically with respect to said longitudinal axis of said module and at least one auxiliary sleeve arranged between said sheath and said shell.

According to another particular aspect of the invention, the module comprises at least three auxiliary sleeves arranged in an arc of circle fashion and arranged equidistant from each other and with respect to said sheath.

According to a particular aspect of the invention, the module comprises at least two flexible sheaths extending eccentrically with respect to said longitudinal axis of said module and at least one auxiliary sleeve arranged between said sheaths and said shell.

According to another particular aspect of the invention, the module comprises three flexible sheaths arranged equidistant from said longitudinal axis and from each other, and at least three auxiliary sleeves arranged equidistant from each other and with respect to said sheaths.

Hence, the module according to the invention may have different configurations, with a number, positions, multiple dimensions for the sheath(s) through the module. The same applies for the auxiliary sleeve(s) extending through the module. Thus, it is possible to manufacture a module perfectly suited to the need of the user. The only limit lies in the dimensions of the module, in particular in the elongated position.

In another particular aspect of the invention, each end coupling is coupled to a check valve, said check valve being in fluidic communication with the sheath.

In this manner, it is possible, during the variation of the internal volume of the sheath due to the successive change in position of the module, to successively create cycles of suction and discharge of a liquid so as to pump the latter, for example.

According to another particular aspect of the invention, at least one amongst said at least one sheath arranged inside said shell and opening at the end connectors comprises a check valve at each of these ends.

The invention also relates to a system comprising at least two modules as described before.

According to the invention, said system comprises means for assembling a first module with a second module, said first and second modules being arranged in series.

Thus, the invention provides a new modular system solution allowing assembling modules one after another in order to provide different functions. Hence, the system of the invention allows adapting easily to the needs of the user. In addition, the modularity of the system allows facilitating maintenance of the system, since the modules are easily dismountable to enable repair or replacement thereof.

According to another particular aspect of the invention, said assembly means comprise an assembly flange comprising two half-shells configured to clasp the adjacent end couplings of two modules to be assembled.

Such assembly means are simple and inexpensive to implement. They further offer a reliable assembly solution.

According to another particular aspect of the invention, at least a first one of said modules comprises a push element capable of crossing at least another one of said modules, adjacent to said at least one first module, so as to transmit a force and/or a translational movement during the change of state of said at least one first module.

The invention also relates to a method of use of a system comprising two modules as described before. According to the invention, the method comprises a pushing cycle of a system comprising the steps of:

- locking the position of the system with respect to an element external to the module during inflation of a first module;
- displacing the push element relative to an element external to the module by inflation of a second module.

Such a method enables the system to transmit a pushing force and/or movement.

The invention also relates to a method of use of a system comprising three modules as described before. According to the invention, the method comprises an advance cycle of a system in a pipe comprising the repetition of the following steps:

first locking of the position of the system with respect to an element external to the module during the inflation of a first module;

first advance of the system relative to an element external to the module during the inflation of a second module;

second locking of the position of the system with respect to an element external to the module during the inflation of a third module;

second advance of the system relative to an element external to the module during the deflation of said first and second modules;

unlocking of the position of the system with respect to an element external to the module by deflation of said third module.

LIST OF THE FIGURES

The invention, as well as the different advantages it has, will be more easily understood, in light of the following description of an illustrative and non-limiting embodiment thereof, and from the appended drawings, wherein:

FIG. 1 illustrates a sectional view of a fluidic muscle according to the prior art;

FIG. 2*a* is a sectional view of a module forming a mechanical actuator according to a first embodiment of the invention, the module being in the elongated or rest position;

FIG. 2*b* is a sectional view of the module of FIG. 2*a* in the retracted position;

FIG. 2*c* is a sectional view of the module of FIG. 2*a*, bent and in the elongated position;

FIG. 3*a* is a sectional view of a module forming a mechanical actuator according to a second embodiment of the invention, the module being in the elongated position;

FIG. 3*b* is a sectional view of the module of FIG. 3*a* in the retracted position;

Figure 10A:
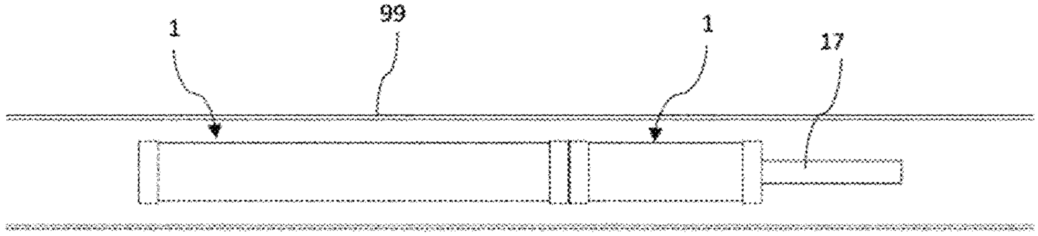
Figure 10B:
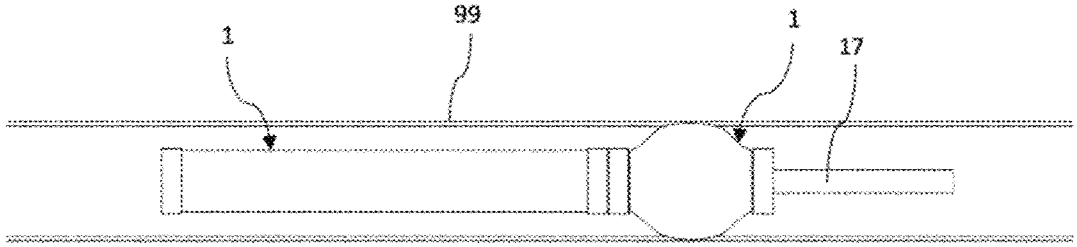
Figure 10C:
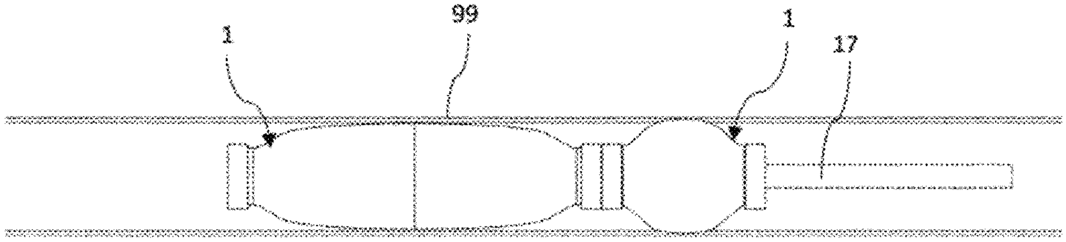
Figure 11:
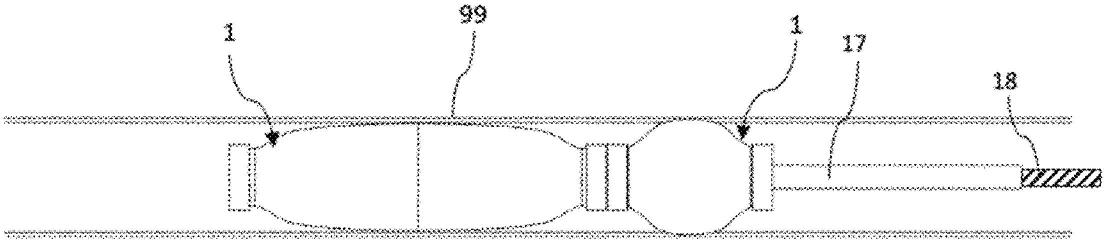
Figure 12:
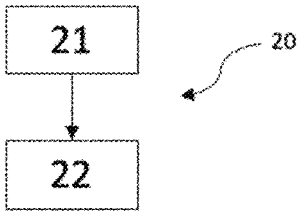

FIG. 10*a* FIG. 10*b* FIG. 10*c* are side views illustrating the kinematics of a first embodiment of a method of use of a system according to the invention;

FIG. 11 is a side view of a variant of the system of FIGS. 10*a* to 10*c* showing that the system could be provided with an accessory element; and FIG. 12 is a diagram illustrating the steps of the method of use of FIGS. 10*a* to 10*c;*

Figure 13A:
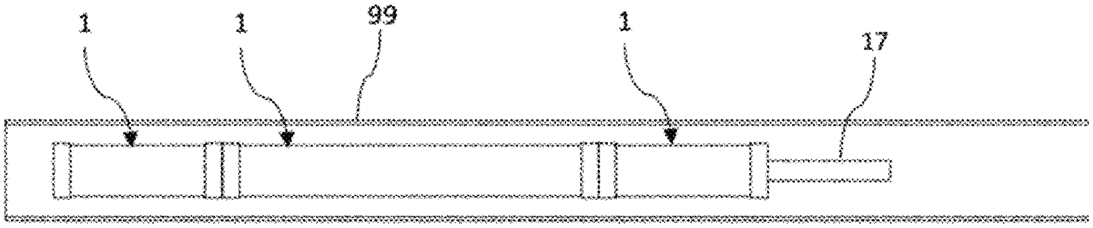
Figure 13B:
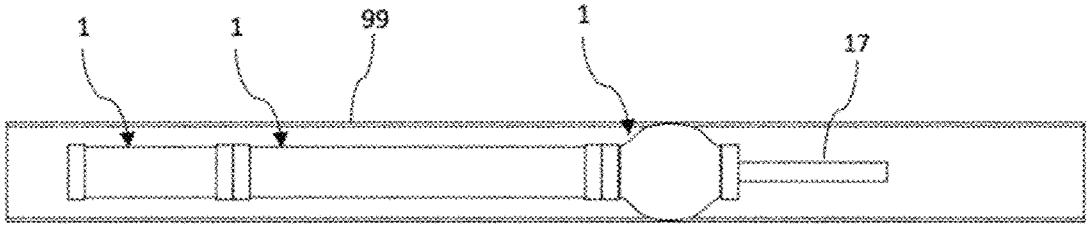
Figure 13C:
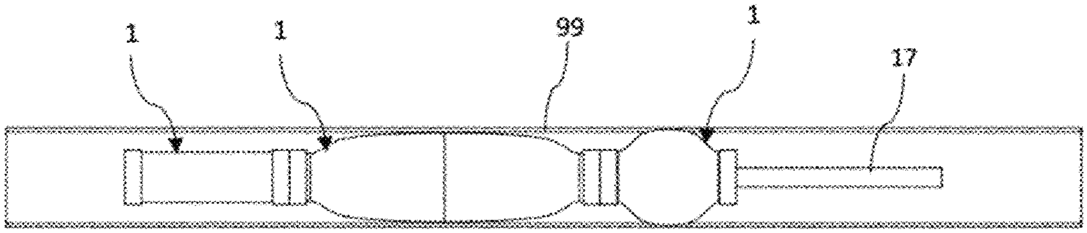
Figure 13D:
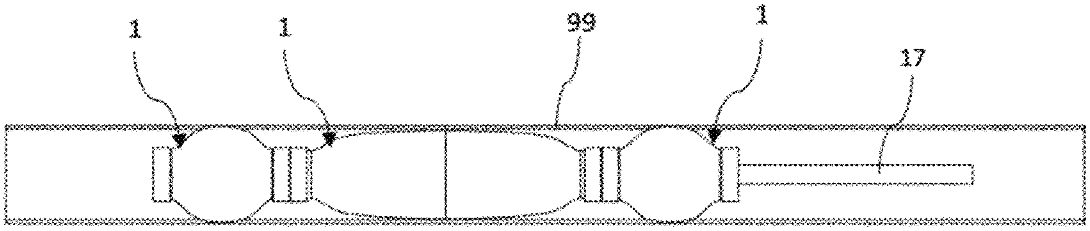
Figure 13E:
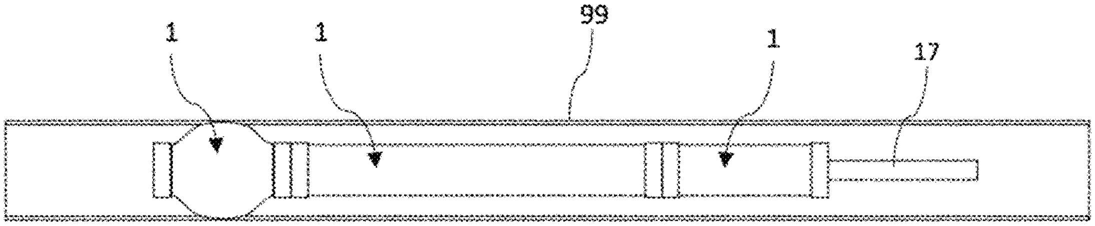
Figure 13F:
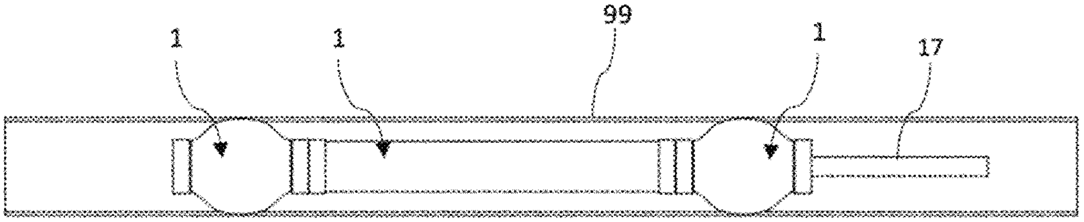
Figure 14:
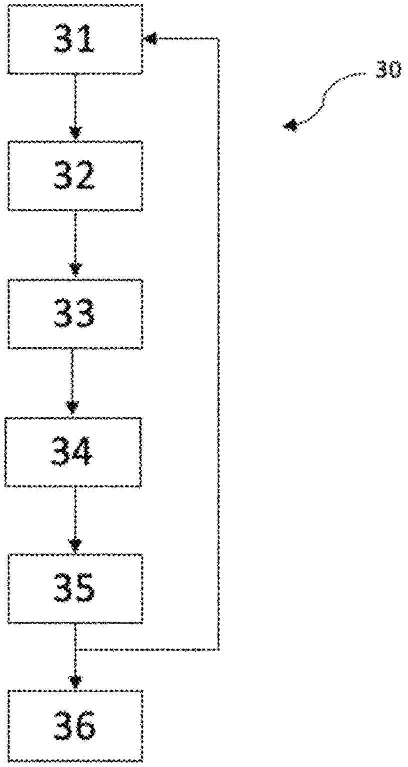

FIG. 13*a* FIG. 13*b* FIG. 13*c* FIG. 13*d* FIG. 13*e* FIG. 13*f* are side views illustrating the kinematics of a second embodiment of a method of use of a system according to the invention;

FIG. 14 is a diagram illustrating the steps of the method of use of FIGS. 13*a* to 13*f;*

Figure 15A:
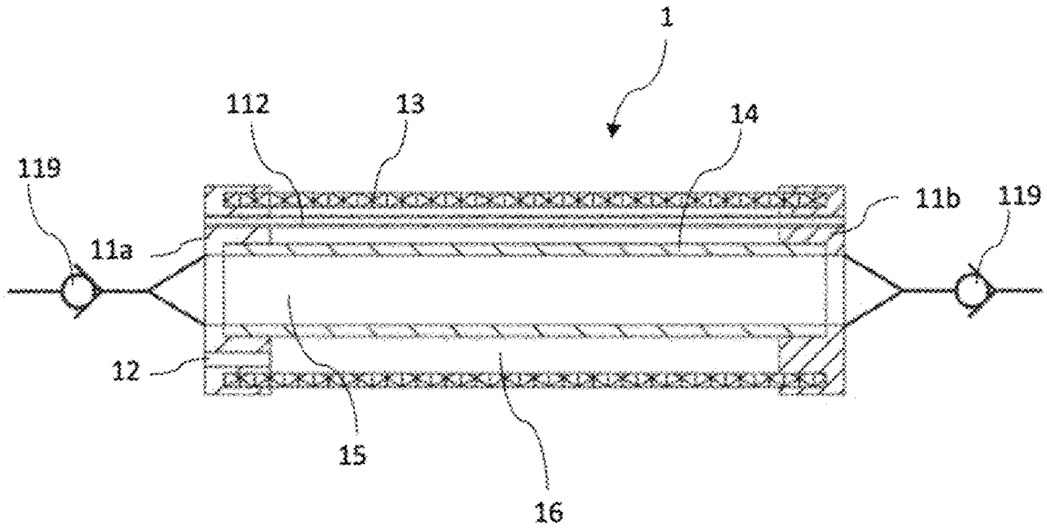
Figure 15B:
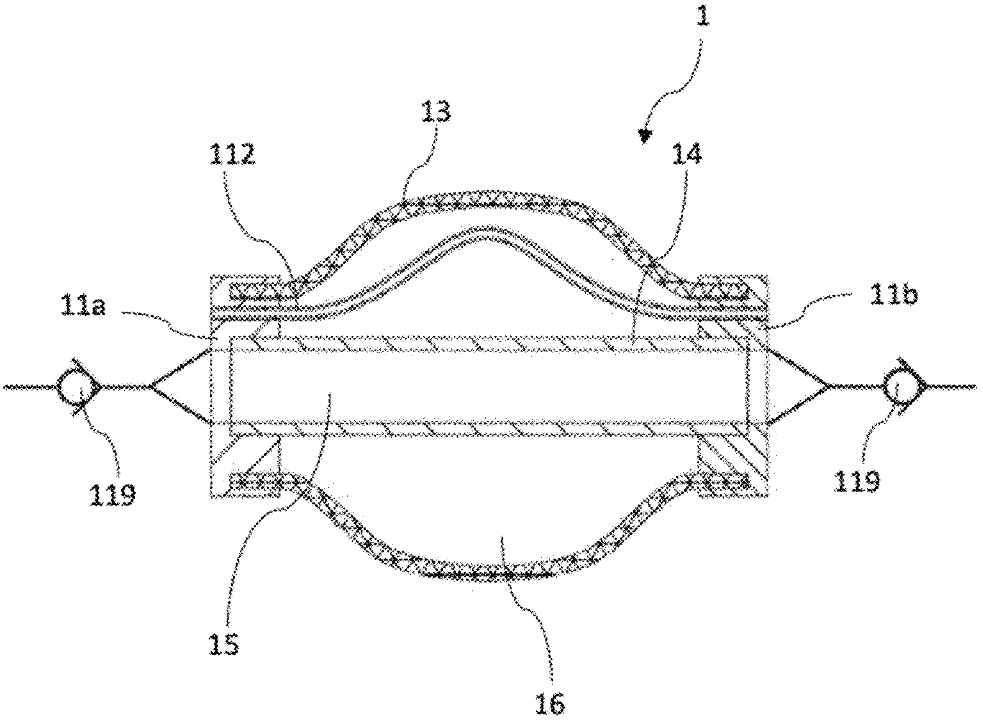

FIG. 15*a* is a sectional view illustrating a particular application of a module according to the first embodiment of the invention, the module being in the elongated or rest position;

FIG. 15*b* is a sectional view illustrating the particular application of a module according to the first embodiment of the invention, the module being in the retracted position.

DETAILED DESCRIPTION OF THE INVENTION

The general principle of the invention is based on the implementation of at least one flexible and sealed sheath within a module substantially in the form of a fluidic muscle or bladder so as to form an inner through-passage enabling a direct passage, for example, of power transmission means without resorting to power conversion means such as motors.

The invention also provides for the addition of an incompressible push element to enable the use of the module of the invention in pushing. In other words, the change of state of the module from the deflated state into the inflated state allows working in pulling, i.e. applying a force and a translational movement in pulling/backwards, which is conventional. The implementation of an incompressible push element allows, during the change of state from the inflated state into the deflated state, working in pushing, i.e. applying a force and a translational movement in pushing/forwards, which differs in particular from the prior art.

The invention is modular meaning that it enables an easy assembly of several modules in accordance with the invention, inflatable independently of one another for example, in order to obtain different movement and power transmission functions.

The invention could also allow transmitting a pulling and/or pushing movement of the modules, for example of the muscle and/or bladder type, to each other. More specifically, depending on its change of state (from inflated into deflated and vice versa), a first module could transmit a pulling or pushing movement to one or more other next module(s) in order to obtain complex mechanical functions, such as an angular tilting, a transformation of a translational movement into a rotational movement, or a composition of movements within a reduced size.

For example, when a module is used alone, it can provide a locking function. When two modules are assembled, they can provide a push function. Finally, when three modules are assembled, they can provide an automatic advance function, when a particular inflation and deflation sequence is applied to these three modules.

Of course, a larger number of modules may be implemented to provide additional functions.

This modularity also allows facilitating maintenance operations of a system comprising a plurality of modules. Indeed, a damaged module can be easily replaced since they are independent.

According to at least one particular application of the invention, the modules may be flexible so as to enable the passage of the elbows when they are implemented in the field of robotics applied to pipes, for example.

The inner sheath(s) of the modules of the invention, when designed not to change in diameter, form during the elongation or shortening of the muscle or of the bladder (i.e. during the change of state of the module) a variable displacement chamber making these sheaths able to enable pumping of fluid(s). In this manner, the modules of the invention are then used as volumetric pumps whose ratios are set by the diameters of the chambers delimited by the inner sheaths.

Moreover, when the inner sheath(s) of the modules of the invention are designed to crush during the inflation of the inflation chamber delimited by the outer shell and the inner sheath(s), the pinching effect caused by this deformation makes the module of the invention capable of immobilising an accessory arranged inside the module, for example so as to impart a pull force thereon by means of another module.

Different embodiments of the invention are described in the following description. It should be noted that the elements identical to the different embodiments have the same reference numerals and are not described again.

1st Embodiment of a Module According to the Invention

Figure 1:
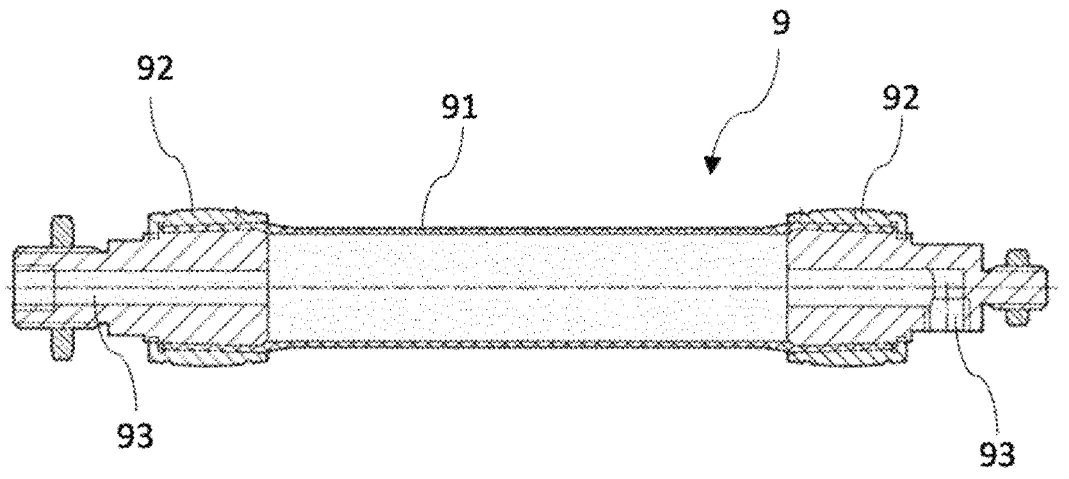
Figure 2A:
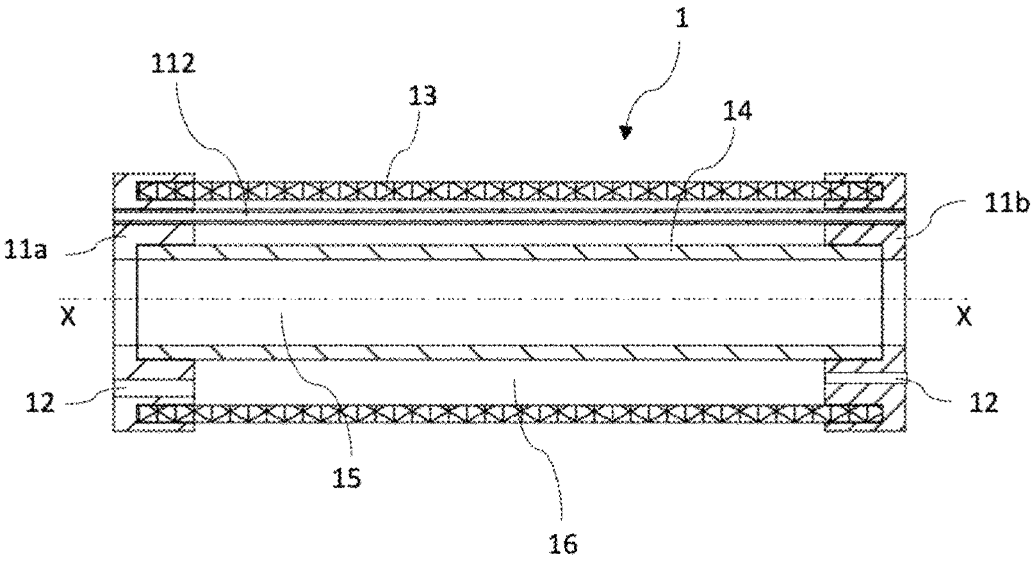
Figure 2B:
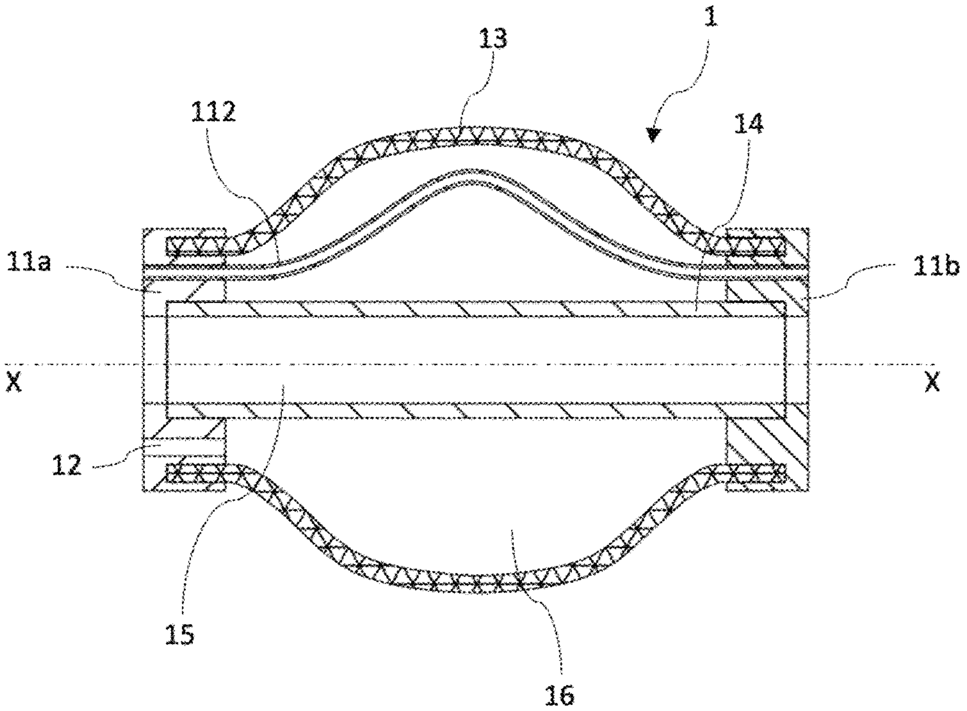
Figure 2C:
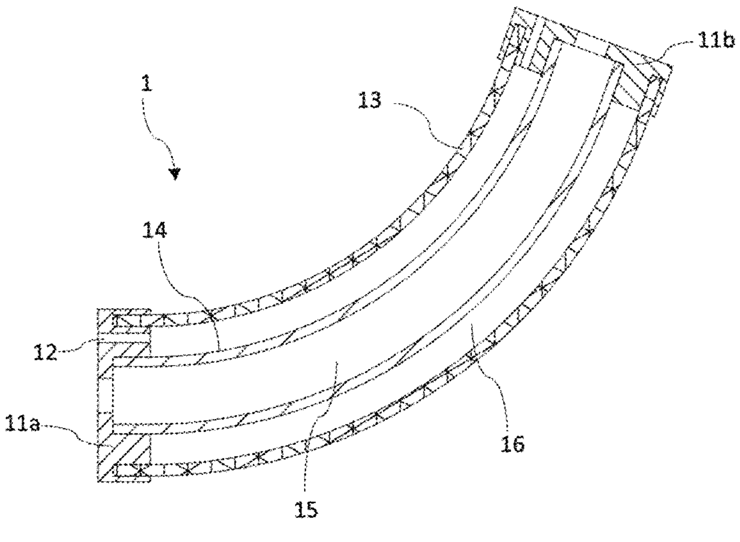

FIGS. 2*a* to 2C illustrate a module 1 according to a first embodiment of the invention, in different states. More specifically, in this illustrated first embodiment, the module 1 comprises a reinforced outer shell 13 so as to prevent axial elongation thereof during inflation. Hence, the module 1 is in the form of a fluidic muscle.

Of course, it should be understood that the description given hereinafter in connection with the muscle of this first embodiment could be applied with a reinforced outer shell 13 so as to prevent transverse elongation thereof during inflation. The module 1 would then be in the form of a fluidic bladder.

FIG. 2*a* illustrates the module 1 in a deflated state, i.e. the module 1 is in an extended or rest position. FIG. 2*b* illustrates the module 1 in an inflated state, i.e. the module 1 is in a retracted position. In this position, it should be noted that the length of the module 1 is reduced compared to the elongated position. FIG. 2*c* illustrates the module 1 in an elongated and bent position, for example to enable the passage of elbows when the module 1 is used in pipes.

The module 1 comprises first 11*a* and second 11*b* sealed end couplings, or connectors. A flexible shell, or membrane, 13 is arranged between the first 11*a* and second 11*b* end couplings. More specifically, the shell 13 is sealingly fastened to the end couplings 11*a*, 11*b*.

The end couplings 11*a*, 11*b* have fluid supply means 12, preferably air or an incompressible fluid. In this example, the supply means in is the form of an introduction/discharge orifice formed in each of the end couplings 11*a*, 11*b*. It should be understood that if the module 1 is a module located at the end of a system, it may have only one orifice, located on either one of the end couplings 11*a*, 11*b*. Indeed, when several modules are implemented one after another (as described in more details hereinafter), the modules can be supplied individually from the supply port(s) or sleeve(s) 12 of the couplings 11*a*, 11*b* so as to be able to control each module to obtain a specific function, or alternatively be supplied in series by the same pressure source. Thus, each end coupling 11*a*, 11*b* comprises one or more introduction orifice(s) and may include one or more discharge orifice(s).

The shell 13 and the end couplings 11*a*, 11*b* together form a fluidic muscle such that the flexible shell 13 is capable of between deforming an inflated state, corresponding to a retracted position of the module 1 (FIG. 2*b*), when an inflation fluid is introduced into the shell 13 and a deflated state, corresponding to an elongated position of the module 1 (FIGS. 2*a* and 2*c*), when the inflation fluid is discharged/removed from the shell 13.

The switch from an inflated state into a deflated state also corresponds to the switch from a rigid state (FIG. 2*b*) into a flexible state (FIG. 2*a*). In the flexible state, i.e. when the module 1 is deflated, the latter is capable of bending (as illustrated in FIG. 2*c*), so as to enable the passage of elbows in pipes, for example.

When switching from the deflated state into the inflated state, the module 1 retracts, i.e. shrinks. In other words, the length of the module 1 decreases under the effect of the deformation of the shell 13 which inflates. This change of state enables the module 1 to apply a pulling force and therefore a translational movement, because of the decrease in the length of the module 1.

According to the invention, the module 1 comprises at least one flexible sheath 14 in the form of a tube. By "tube", it should be understood a tubular duct that is long rather than wide and which could have a section that is circular, square, rectangular or has any other shape. In the illustrated example, one single sheath 14 is implemented in the module 1 but it should be understood that it is possible to implement several ones, with variable dimensions and arranged as desired, according to the needs of the user.

The flexible sheath 14 is arranged inside the shell 13 and opens at each end coupling 11*a*, 11*b*. Thus, the sheath 14 forms/creates a through-passage 15 which extends substantially longitudinally through the module. In this example, the sheath 14 extends coaxially with the longitudinal axis X-X of the module 1. Other implementations, described in the following description, are nevertheless possible without departing from the general principle of the invention.

The sheath 14 is made of a flexible material to allow, in the elongated position of the module 1 (FIG. 2*c*), bending/twisting to enable the passage of the pipe elbows, for example. The material of the sheath 14 is also fluid-tight so that the sheath 14 forms, with the shell 13 and the end couplings 11*a*, 11*b*, an inflation chamber 16 into which the inflation fluid is introduced/discharged.

In this first embodiment of the invention, the sheath 14 is compressible so as to adapt to the change in length of the module 1, without buckling. Thus, the sheath 14 remains straight, in other words it remains in its axis, when the module 1 retracts.

In this embodiment, the module 1 is intended to work in pulling, i.e. the switch from the elongated position into the retracted position allows exerting a pulling force and a translational movement backwards since the module 1 will pull.

As indicated before, this description is made in connection with a fluidic muscle which, during inflation, expands diametrically, i.e. transversely to its longitudinal axis. Of course, it should be understood that the general principle could also be applied to a bladder which, during inflation, expands axially.

In a variant (not illustrated), the addition of a return element, such as a return spring for example, could allow imparting a push force during the deflation of the module and thus allow working also in pushing. The return force may also be obtained by an elastic deformation of the sheath 14 which will tend to recover its shape after the inflation phase (shortening) and will participate in returning the muscle back to its resting state (elongated).

In addition, the sheath 14 is configured to resist the external pressure exerted by the fluid when it is injected under pressure into the inflation chamber 16. More particularly, the sheath 14 should resist a pressure higher than or equal to the inflation pressure of the chamber 16, whether this pressure is pneumatic or hydraulic. To do so, the material is selected to resist this pressure alone. Alternatively, reinforcement means may be provided, while guaranteeing the flexibility and the compressibility of the sheath 14.

As described before, the sheath 14 forms a through-passage 15 through the module 1. This through-passage 15 opens at least at one of the two end couplings 11*a*, 11*b* and is configured to receive at least one accessory element 18. This accessory element 18 may be fixed in the through-passage 15 or movable in translation and/or in rotation (as detailed with reference to FIG. 4).

For example, the through-passage 15 is configured to receive an accessory element 17 which may be selected from among a rotary torsion cable capable of transmitting power to a tool, a high-pressure or very-high-pressure hydraulic hose, a pneumatic hose, an electric power supply cable (such as an electric power cable for example), a data transmission cable (such as USB, HDMI, etc.), a mechanical pull cable, a rigid or flexible axis which may be fixed or rotary, or a push element of another module.

Other unlisted accessory elements 18 may also be implemented in the through-passage 15 yet without departing from the general principle of the invention.

According to a particular application of the invention, the through-passage 15 is capable of receiving an accessory element 18 in the form of a rotary torsion cable. Indeed, such a rotary torsion cable allows transmitting a high power directly to a tool or a piece of equipment located at the front of the system. Such a solution allows doing without the use of power conversion elements such as electric, hydraulic or pneumatic motors usually integrated into the systems/robots of the prior art and which have a limited power because of the space that is allocated thereto within the system/robot.

Indeed, depending on the diameter selected, such a rotary torsion cable could transmit a power higher than 1 kW, for a reduced size requirement compared to a system implementing an electric, hydraulic or pneumatic motor of the prior art.

As illustrated in FIGS. 2*a* and 2*b* (not illustrated in FIG. 2*c*), the module 1 implements at least one auxiliary sleeve 112 (one single auxiliary sleeve is illustrated in the figures) which extends between the two end couplings 11*a*, 11*b* and therefore crosses the entire module 1. More specifically, the auxiliary sleeve 112 is sealingly fastened at channels or openings formed in the end couplings 11*a*, 11*b*.

The auxiliary sleeve 112 is flexible so as to enable the passage of the elbows. It could also buckle or more generally deform during the retraction of the module 1, as illustrated in FIG. 2*c*.

Preferably, the auxiliary sleeve 112 is sealed and is configured to receive or form at least one piece of equipment which could be selected from among a high-pressure or very-high-pressure hydraulic hose, a pneumatic hose, an electric power supply cable (such as an electric power cable for example), a data transmission cable (such as USB, HDMI, etc.), a mechanical pull cable, a rigid or flexible axis which may be fixed or rotary, or a push element of another module, or a combination of these pieces of equipment.

Like the sheath 14, the auxiliary sleeve 112 is configured to resist the external pressure exerted by the fluid when it is injected under pressure into the inflation chamber 16.

In a non-illustrated variant, it is possible to consider providing an auxiliary sleeve configured to crush under pressure so as to prevent a flow of a fluid.

FIGS. 15*a* and 15*b* illustrate the module 1 according to a particular application which allows obtaining a pumping action of a fluid. More specifically, check valves 119 are implemented at each of the ends 11*a*, 11*b* of the module 1. These valves 119 are in fluidic communication with the internal volume of the sheath 14. The volume within the sheath 14 is a cylinder with a variable volume, since it is larger when the module 1 is in the elongated position than when it is in the retracted position, it is therefore possible to successively create cycles of suction and discharge of a liquid by inflation and deflation of the module 1.

2nd Embodiment of a Module According to the Invention

Figure 3A:
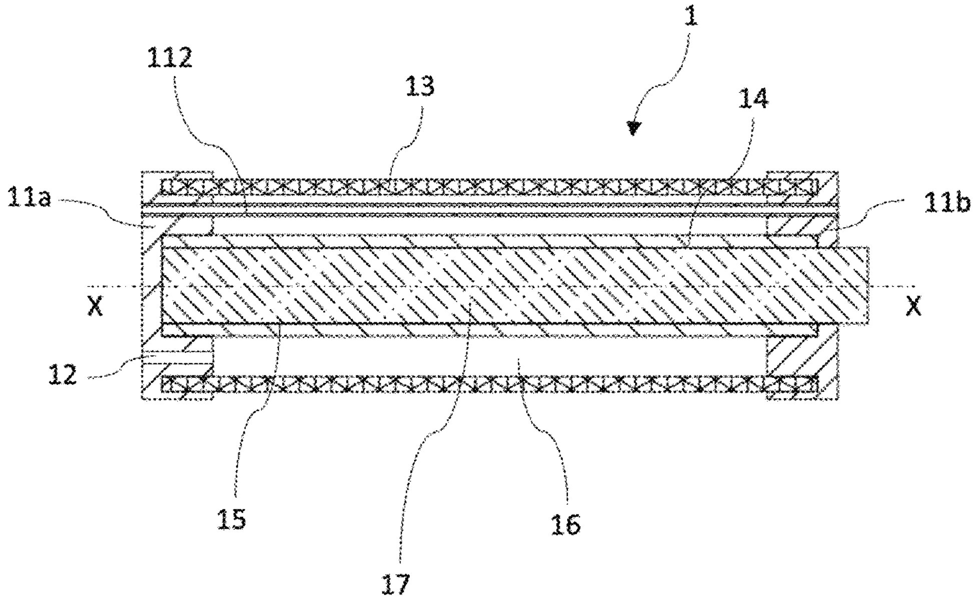
Figure 3B:
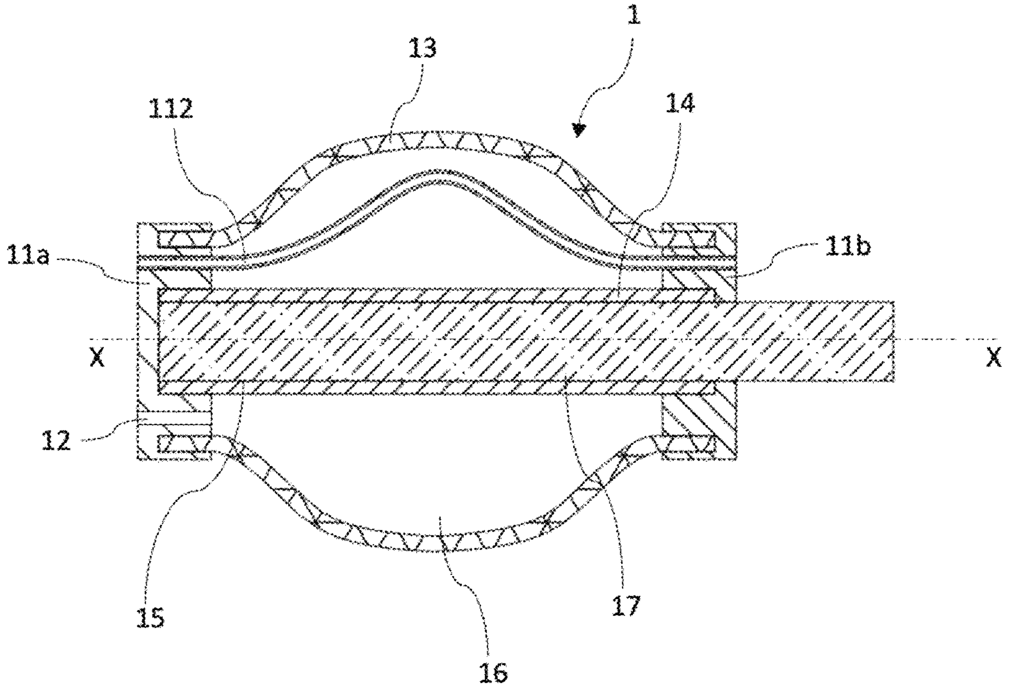

FIGS. 3*a* to 3*b* illustrate a module 1 according to a second embodiment of the invention, respectively in a deflated state, i.e. the module 1 is in an elongated position and in an inflated state, i.e. the module 1 is in a retracted position.

In this second embodiment of the invention, the module 1 is substantially identical to the module of the first embodiment. Consequently, the identical elements keep the same reference numerals and are not therefore described again.

Thus, the module 1 comprises a muscle-type shell 13, i.e. reinforced so as to prevent elongation thereof during inflation, arranged between two end couplings 11*a*, 11*b* having fluid supply means 12. The module 1 also comprises a sheath 14 which could be flexible extending into the shell 13 between the first 11*a* and second 11*b* end couplings so as to form an inflation chamber 16 and a through-passage 15. The module 1 may also comprise at least one auxiliary sleeve 112 (one single sleeve is illustrated in the figures).

Again, in the illustrated example, one single sheath 14 is implemented in the module 1 but it should be understood that it is possible to implement several ones with variable dimensions and arranged as desired, according to the needs of the user.

In this second embodiment, the through-passage 15 arranged in the sheath 14 receives a push element 17. In the illustrated example, the push element 17 is in the form of a rigid or flexible solid rod. The push element 17 is mounted fixed at least in translation on the first end coupling 11*a*. In other words, the first end coupling 11*a* forms a stop for the push element 17, i.e. it forms the fixed point of the push element 17, which enables the latter to come out of the module from this point.

Moreover, the push element 17 is mounted free at least in translation relative to the second end coupling 11*b*. Thus, during a change of state of the module 1, the push element 17 can slide through the second end coupling 11*b*.

Preferably, the push element 17 is flexible to enable a deformation of the module and in particular the passage of bends in the pipes or an environment including curves, as illustrated with reference to FIG. 2*c* of the first embodiment. Thus, the implementation of the push rod 17 does not prevent the module 1 from bending when necessary (in the elongated position).

Alternatively, the push element 17 may also be rigid and be in the form of a metal rod, for example, in order to avoid buckling, when this is preferred. It is possible to consider implementing a removable push element 17 in order to enable an easy replacement of the latter to facilitate maintenance and leave the user free to choose between a flexible or rigid push element, according to the needs.

Furthermore, the push element 17 is incompressible to enable working in pushing. More specifically, the push element 17 being mounted movable in translation relative to the second end coupling 11*b*, when the module 1 is inflated and therefore switches from the elongated position into the retracted position, it is capable of moving relative to the second end coupling 11*b* and projecting, i.e. coming out, from the module 1. Thus, the push element 17 is capable of transmitting a pushing force and a forward translation (i.e. pushing) movement.

In one variant (not illustrated), the addition of a return element, such as a return spring for example, could also allow imparting a pulling force during the deflation of the module and thus also working in pulling.

An advantage of the module 1 according to the invention compared to a conventional actuator cylinder as described in connection with the prior art is that it allows transmitting high forces (for example up to 6,000 N when using a rigid push element and a module with a diameter of 40 mm) while proposing an actuator with reduced dimensions (having for example a diameter comprised between 25 and 100 mm in the deflated state). The module 1 of the invention also allows providing an actuator that is flexible when the push element 17 is flexible so as to be able to use such a module 1 in pipes, in particular.

3rd Embodiment of the Module

Figure 4:
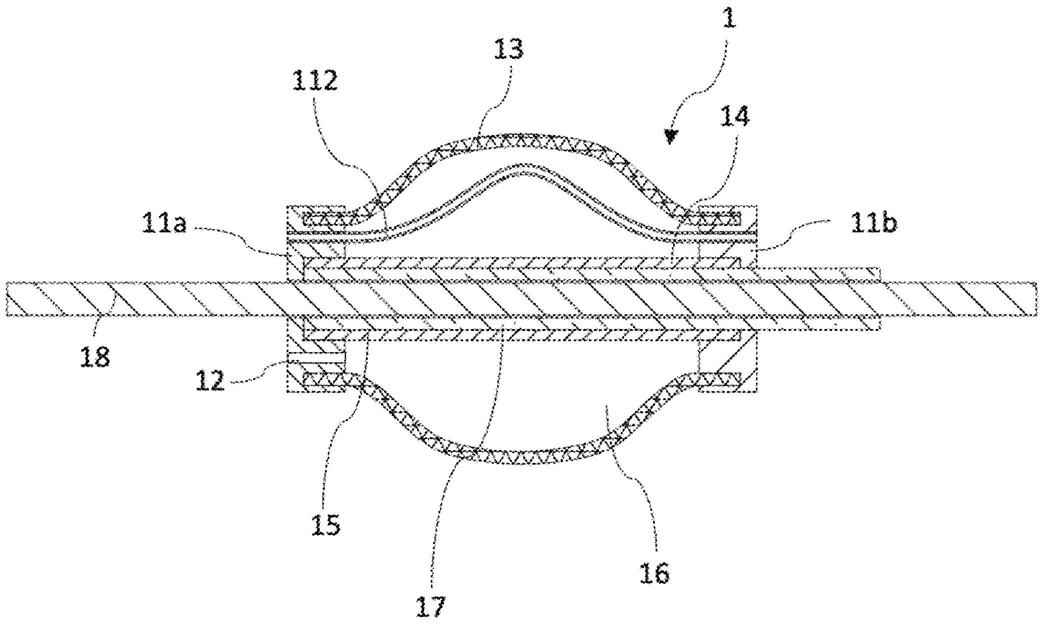
FIG. 4 is a sectional view of a module forming a mechanical actuator according to a third embodiment of the invention, the module being in the retracted position.

FIG. 4 illustrates a module 1 according to a third embodiment of the invention, the module being in the retracted position in this figure. Of course, the module 1 is capable of moving between an elongated position (not illustrated) and a retracted position.

The module 1 according to the third embodiment of the invention is substantially identical to the module 1 described in connection with the second embodiment. Consequently, the identical elements keep the same reference numerals and are not therefore described again.

Thus, the module 1 comprises a shell 13 arranged between two end couplings 11*a*, 11*b* having fluid supply means 12. The module 1 also comprises a flexible sheath 14 extending into the shell 13 between the first 11*a* and second 11*b* end couplings so as to form an inflation chamber 16 and a through-passage 15. In this example, the module 1 also comprises an auxiliary sleeve 112.

Again, in the illustrated example, one single sheath 14 is implemented in the module 1 but it should be understood that it is possible to implement several ones, with variable dimensions and arranged as desired, according to the needs of the user.

The module 1 of this third embodiment differs from the second embodiment in that the push element 17 is herein hollow so as to form a central passage for the module 1 therethrough and which opens at the end couplings 11*a* and 11*b*. The central passage is configured to receive at least one accessory element 18 (only one is illustrated in FIG. 4).

The accessory element 18 may be fixedly received in the central passage. Nonetheless, the accessory element 18 is preferably received movable in translation and/or in rotation.

The accessory element 18 may be selected from among: a rotary torsion cable capable of transmitting power to a tool, a high-pressure or very-high-pressure hydraulic hose, a pneumatic hose, an electric power supply cable (such as an electric power cable for example), a data transmission cable (such as USB, HDMI, etc.), a mechanical pull cable, a rigid or flexible axis which may be fixed or rotary, or a push element of another module.

Other unlisted accessory elements 18 may also be implemented in the through-passage 15 yet without departing from the general principle of the invention.

According to a particular application of the invention, the through-passage 15 is capable of receiving an accessory element 18 in the form of a rotary torsion cable. Such a rotary torsion cable allows transmitting high power directly to a tool or a piece of equipment located at the front of the system. Such a solution allows doing without power conversion devices such as electric, hydraulic or pneumatic motors integrated into the systems/robots of the prior art and which have a power limited by the space allocated thereto within the system/robot.

In the embodiment illustrated in FIG. 4, the sheath 14 is flexible and compressible. The pushing force is obtained by the implementation of an incompressible push element 17 similar to that one described in connection with the second embodiment.

In a variant of this embodiment (not illustrated), the push element is formed by the sheath 14 which is then incompressible in this case (but which may be flexible). To do so, the sheath 14 is mounted fixed in translation on the first end coupling 11*a* (like for the other described embodiments) and movable at least in translation on the second end coupling 11*b*. In this manner, during a change of state of the module 1, the sheath 14 can slide relative to the second end coupling 11*b*. In order to guarantee sealing of the inflation chamber 16, sealing means, in the form of a seal for example, may be implemented at the end coupling 11*b* cooperating with said sheath 14. Thus, the sheath 14 (incompressible in this variant) allows transmitting a pushing force and an advance translational movement.

4th Embodiment of a Module According to the Invention

Figure 5:
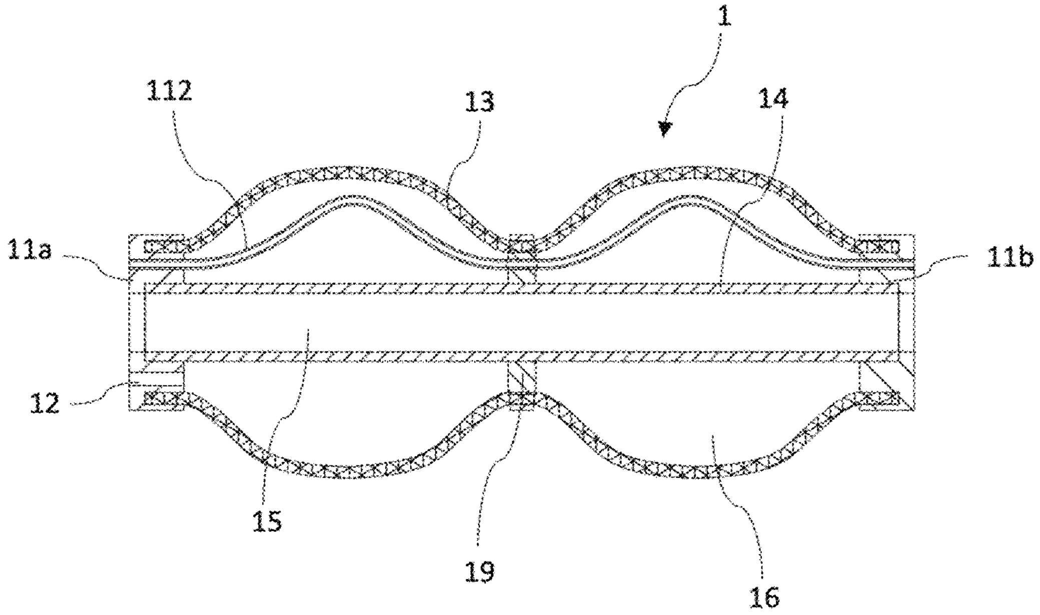
FIG. 5 is a longitudinal sectional view of a module forming a mechanical actuator according to a fourth embodiment of the invention, the module being in the retracted position.

FIG. 5 illustrates a module 1 according to a fourth embodiment of the invention, the module being in the retracted position in this figure. It should be understood that the module 1 is capable of moving between an elongated position (not illustrated) and a retracted position. The module 1 according to the fourth embodiment is compatible with the previously-described embodiments, i.e. with one or more compressible or non-compressible sheath(s), with or without a push element and with or without accessories.

This fourth embodiment describes the implementation of an intermediate element 19, for example in the form of a flange, configured to clamp the shell 13 and to guide the flexible sheath 14. Such an intermediate element 19 is advantageous when the module 1 has a significant length (for example a length longer than 250 mm for a diameter of 40 mm) so as to limit/avoid buckling during the push, for example.

Indeed, when the length of the module 1 is significant, there is a risk of the sheath 14 buckling instead of simply compressing/retracting. Yet, buckling is detrimental to the module 1 because it limits the obtained stroke and could damage the constituent elements of the module 1 as well as the accessory elements 18 received in the through-passage 15 or the equipment received in the auxiliary sleeves 112. In addition, buckling of the sheath 14 could result in a disconnection of the latter with respect to the end couplings.

Such a configuration also allows increasing and adjusting the flexibility of the module when the latter is inflated and its rigidity is higher.

Although only one intermediate element 19 is implemented in the example illustrated, it is possible to implement several intermediate elements 19 depending on the length of the module 1 in order to suppress or at least limit the risks of buckling of the module during the change of state of the module 1.

5th and 6th Embodiments of the Module According to the Invention

These embodiments are illustrated and described in order to show that the module 1 according to the invention could enable the transmission of pulling and/or pushing movements of the modules, for example of the muscle and/or bladder type, to each other. More specifically, depending on the change of state thereof (from deflated to deflated and vice versa), a first module could transmit a pulling or pushing movement to one or more other next module(s) in order to obtain complex mechanical functions, such as an angular tilting, a transformation of a translational movement into a rotational movement, or a composition of movements within a reduced size.

The module 1 according to the invention may have a large number of possible configurations, in terms of numbers of sheaths and auxiliary sleeves, as well as in terms of dimensions and positioning of these in the module 1, provided that they are suitable for the dimensions of the module 1. It should be noted that these embodiments are compatible with all of the previously-described embodiments.

Figure 6:
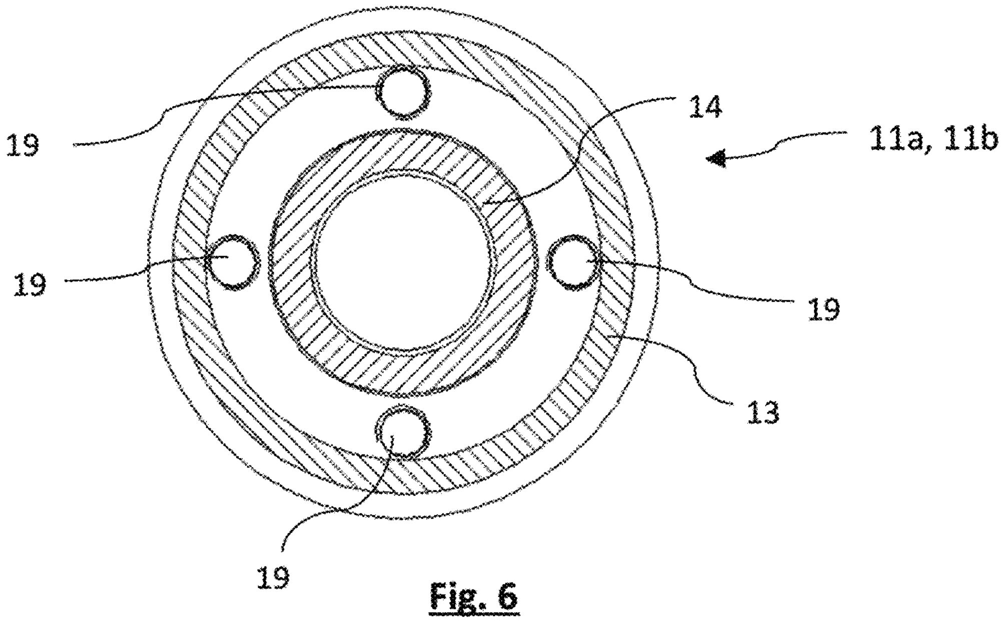
FIG. 6 is a cross-sectional view of a module according to a fifth embodiment compatible with the embodiments one to four.

FIG. 6 illustrates a fifth embodiment of the invention showing a cross-section of a module 1. In this fifth embodiment, the module 1 comprises one single through-passage 15 formed by a flexible sheath 14 extending coaxially with the longitudinal axis X-X of the module 1. The module 1 also comprises at least one auxiliary sleeve 112 arranged between the sheath 14 and the shell 13.

More specifically, in the illustrated example, the module 1 comprises four auxiliary sleeves 112 arranged equidistant, or at regular distances, from each other and with respect to the sheath 14. Hence, the arrangement of the auxiliary sleeves 112 herein forms a square. It should be understood that with three auxiliary sleeves 112, this would form an equilateral triangle, etc. Nonetheless, it should be understood that any positioning of the auxiliary sleeves around the sheath 14 could also be considered.

In a particular example (not shown), the module 1 may comprise three auxiliary sleeves 112, arranged according to an equilateral triangle around the sheath 14, and each comprising a mechanical pull cable. In other words, the centre of the equilateral triangle is arranged coaxially with the module 1. Such a configuration could allow controlling bending of the module 1 by acting on the mechanical pull cables so as to control the orientation of the end of the module 1, carrying for example a tool.

Figure 7:
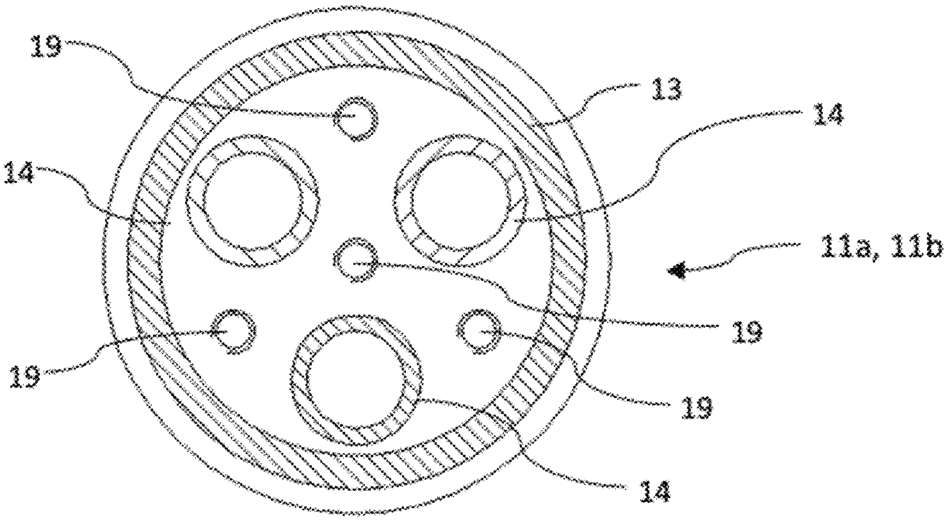
FIG. 7 is a cross-sectional view of a module according to a sixth embodiment compatible with the embodiments one to four.

FIG. 7 illustrates a sixth embodiment of the invention showing a cross-section of an end coupling 11*a*, 11*b* of a module 1. In this sixth embodiment, the module 1 comprises at least two sheaths 14 which extend equidistant from each other and with respect to the longitudinal axis X-X of the module 1. In this example, three sheaths are implemented and are therefore arranged according to an equilateral triangle. It should be understood that if four sheaths had been implemented, they would have been arranged in a square fashion around the longitudinal axis X-X of the module 1. The arrangement of a larger number of sheaths should be easily understood. It should also be understood that any positioning and dimensioning of the sheaths 14 may be considered.

The module 1 also comprises at least one auxiliary sleeve 112 arranged between the sheath 14 and the shell 13. More specifically, the auxiliary sleeves 112 are arranged between the sheaths 14. Hence, it should be noted that the auxiliary sleeves and the sheaths 14 are arranged in an alternating and regular manner. It should also be understood that any positioning of the auxiliary sleeves with respect to the sheaths 14 may be considered. Finally, the auxiliary sleeves 112 may be in the form of pull cables allowing orienting the deformation of the module and inflecting the axial deformation of the module.

These examples are given for indicative and non-limiting purposes. It should be understood that a plurality of implementations could be proposed yet without departing from the general principle of the invention.

Modular System According to the Invention

The invention also relates to a modular system 100 comprising at least two according to the modules 1 invention, irrespective of the previously-described embodiment. The modules 1 are assembled in series, namely one after another.

Hence, the invention proposes a system which comprises at least one two modules 1 according to the invention. Depending on the need and the technical functions to be carried out, all it needs is to select the desired number of modules and then assemble them. For this purpose, simple and quick assembly means are described in more detail later on.

Hence, the modules 1 are assembled one after another while preserving their advantages. Nonetheless, the modules 1 should be selected so as to be compatible with each other so that juxtaposition thereof enables the through-passage(s) 15 of the different modules 1 to cooperate with one another, like the auxiliary sleeves 112. Hence, the assembly of the modules 1 ensures the continuity of the functions of each module 1 to form a functional system.

Figure 8:
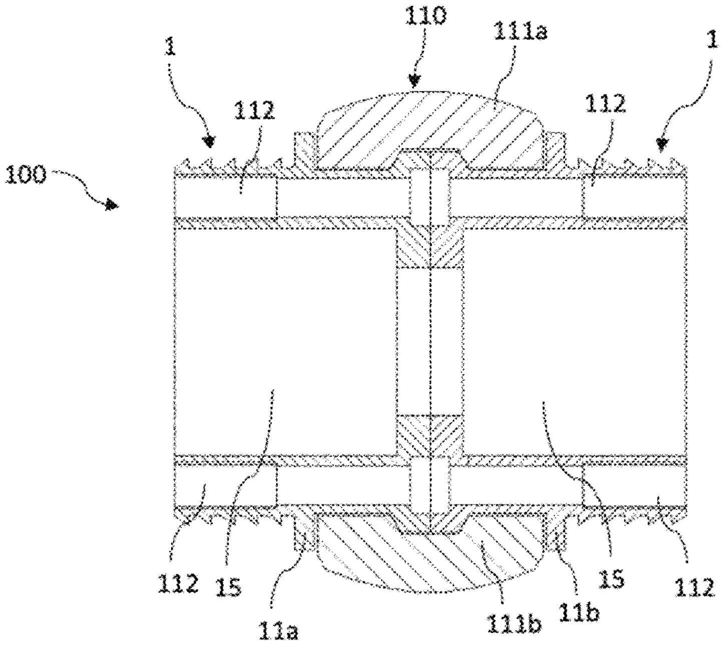
FIG. 8 is a longitudinal sectional view of a system according to the invention illustrating an example of assembly of two adjacent modules, such a system being compatible with all of the embodiments of the module according to the invention disclosed before.
Figure 9:
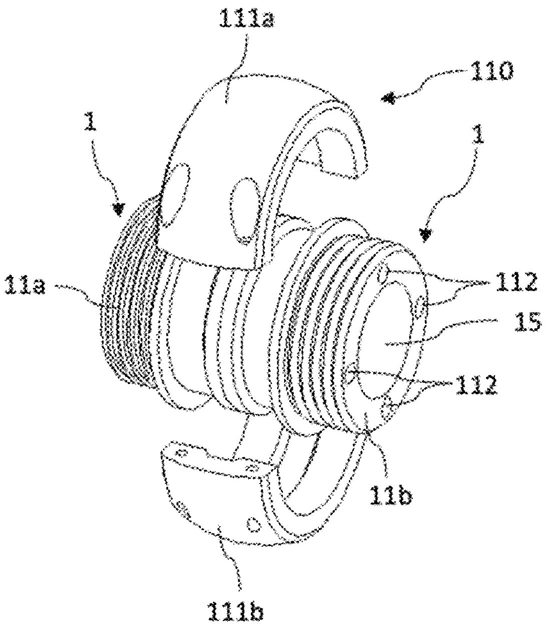
FIG. 9 is a perspective detail view of the example of assembly of two adjacent modules of FIG. 6.

FIGS. 8 and 9 illustrate an example of means 110 for assembling two modules 1 in series. To do so, the end couplings 11*a*, 11*b* of two adjacent modules 1 are juxtaposed/brought into contact with each other, as illustrated in FIG. 8. The through-passages 15 as well as the auxiliary sleeves 112 of the two modules then face one another. In other words, the through-passages 15 face one another, like the auxiliary sleeves 112.

The end couplings 11*a*, are 11*b* brought into contact/juxtaposed in a sealed or non-sealed manner. Sealing means (not shown), for example in the form of seals, may be provided for to ensure sealing between the two end couplings 11*a*, 11*b* and between the through-passages 15 and the sleeves 112 of the two end couplings.

The system 100 comprises assembly means 110 which, in this example, are in the form of a flange comprising two half-shells 111*a*, 111*b* which cooperate with an assembly surface of the end couplings 11*a*, 11*b*.

More specifically, in this example, the flange is a conical flange meaning that each half-shell 111*a*, 111*b* comprises surfaces inclined towards each other over its face oriented towards the end couplings 11*a*, 11*b*. The couplings 11*a*, 11*b* comprise, over the external face and at their end, an assembly surface having a corresponding inclination. Thus, the two half-shells 111*a*, 111*b* are brought close to each other by clasping the end couplings 11*a*, 11*b* of the adjacent two modules 1 to ensure holding thereof. Means for locking the position of the assembly means may also be provided for.

These assembly means 110 allow providing a simple, quick and reliable assembly. Nonetheless, it should be understood that any other type of assembly means could be considered without departing from the general principle of the invention.

For example, it is possible to consider securing two adjacent end couplings 11*a*, 111*b* by screwing the couplings together, by clamping with non-conical half-shells, by means of clamping collars, via a quarter-turn type locking mechanism, etc.

1st Embodiment of a Method of Use of a System According to the Invention

FIGS. 10*a* to 10*c*, 11 and 12 illustrate the steps of a first embodiment of a method of use of a system 100 according to the invention.

More specifically, the system 100 comprises two modules 1 assembled together, in series. In this example, one of the modules has a substantially larger length than the other module. Nevertheless, the operating principle of the system remains the same irrespective of the length of the selected two modules 1.

This first embodiment consists in providing the system 100 with a push function. To do so, the method 20 comprises a push cycle comprising the following steps:

- locking 21 of the position of the system 100 with respect to a member 99 external to the modules 1 during the inflation of a first module 1 (FIG. 10*b*), and
- displacement 22 of the push element 17 or of the incompressible sheath 14 relative to the member 99 external to the modules 1 by inflation of a second module 1 (FIG. 10*c*).

In this example, the second module comprises a push element 17 capable of crossing the first adjacent module 1, so as to transmit a force and/or a translational movement during a change of state thereof.

FIG. 10*a* illustrates the system 100 in its initial state in which the two modules 1 are at rest, i.e. in the elongated position corresponding to a deflated state.

The method of use of the system according to this first embodiment consists in carrying out a push cycle. To do so, a first module 1 is used to lock the position of the system 1 with respect to an external member 99.

Hence, the first module is inflated to switch from the elongated position into the contracted state. This change of state allows locking (step 21) the position of the system.

FIG. 10*b* illustrates locking 21 of the system 100 in a pipe 99. In this example, the inflation of the first module 1 enables locking 21 by direct contact of the shell 13 on the walls of the pipe 99. In a non-illustrated variant, for example when the pipe has a larger dimension, the shell 13 of the module is not able to come into direct contact with the walls of the pipe 99, for example because the of the inflated module is smaller than the diameter diameter of the pipe. Hence, it is possible to implement additional locking means, for example in the form of connecting rods, arms, or any other clamping means, which are activated by the change of state of the first module 1 and which allow immobilising/locking the position of the system.

FIG. 10*c* illustrates the displacement 22 of the push element 17 or of the incompressible sheath 14 of the second module 1 of the system 100 relative to the external member 99 (a pipe in this example). To do so, the second module 1 is inflated so as to switch from the elongated position into the retracted position. This change of state of the second module 1 allows, during retraction of the module, moving the push element 17 or the incompressible sheath 14 exert a force a to and push translational displacement/movement (i.e. forwards).

By keeping the first module inflated, i.e. by keeping the system 100 locked, it is possible to successively inflate and deflate the second module 1 so as to apply a repetition of the pushing movement, for example in order to clear a pipe from an obstacle.

Thus, by assembling two modules, it is possible to create a pushing movement.

In the illustrated example, the first module is that one located at the outlet of the push element 17 or of the incompressible sheath 14, i.e. that one located at the front of the system 100 depending on the direction of movement/push (that one located to the right in FIGS. 10*a* to 10*c*). Hence, the second module is that one located at the rear of the system 100 depending on the direction of movement/push of the push element or of the incompressible sheath 14 (that one located to the left in FIGS. 10*a* to 10*c*).

Furthermore, the modules 1 of the system 100 are selected from among the second (FIGS. 2*a* and 2*b*) and third (FIGS. 3*a* and 3*b*) embodiments the invention. In particular, the first module 1, located at the front of the system 100 (that one furthest to the right in 11*a* to 11*c*), is a module 1 according to the second embodiment, meaning that it does not have a push element. The second module 1, located at the rear of the system (that one located furthest to the left in FIGS. 10*a* to 10*c*), is a module 1 in accordance with the third embodiment, meaning that it has a push element 17 or an incompressible sheath 14 mounted in abutment within the second module 1. This push element 17 or this incompressible sheath 14 is capable of crossing the first module 1.

FIG. 11 illustrates a system in accordance with the previously-described system and shows that the push function could also be obtained with modules 1 comprising an accessory element 18 crossing all of the modules. This accessory element could allow rotating a tool or any other piece of equipment, as described in detail before. The implementation of an accessory element does not change in any way the previously-described kinematics.

2nd Embodiment of a Method of Use of a System According to the Invention

FIGS. 13*a* to 13*f* and 14 illustrate the steps of a second embodiment of a method of use of a system 100 according to the invention.

More specifically, the system 100 herein comprises three two modules 1 assembled together, in series. In this example, one of the modules has a substantially larger length than the other two modules. Nevertheless, the operating principle of the system remains the same irrespective of the length of the selected three modules 1.

This second embodiment consists in providing the system 100 with an advance function. To do so, the method 30 comprises repeating an advance cycle comprising the following steps:

- first locking 31 of the position of the system 100 by inflating a first module 1 (the module located furthest to the right in FIG. 13*b*);
- first advance 32 of the system 100 by inflating a second module 1 (the central module in FIG. 13*c*);
- second locking 33 of the position of the system 100 by inflating a third module 1 (the module located furthest to the left in FIG. 13*d*);

first unlocking 34 of the position of the system 100 by deflating the first module 1 (the module located furthest to the right in FIG. 13*e*) and the second module 1 (the central module in FIG. 13*e*);

holding 35 the position of the system 100 by inflating the first module 1 (the module located furthest to the right in FIG. 13*f*), until return to the first locking step 31 illustrated in FIG. 13*b* which requires inflating the third module 1 (the module located furthest to the left in FIG. 13*b*) beforehand.

FIG. 13*a* illustrates the system 100 in an initial state, in which the three modules 1 are at rest, i.e. in the elongated position corresponding to a deflated state. This state is also found at every end of the repetition of the advance cycles described hereinabove.

The method of use of the system 100 according to this second embodiment consists in carrying out an advance cycle, which, when repeated, allows making the system 100 advance automatically within a pipe 99, for example. This allows increasing the distances of action obtained by existing push systems but also avoiding a user pushing on the system to make it advance in the pipe, in particular when this is necessary over very long distances.

To do so, a first module 1 (located furthest to the right in FIG. 13*a*) is used to lock the position of the system 1 with respect to an external element 99. Hence, the first module is inflated to switch from the extended position into the contracted state. This change of state allows locking (step 31) the position of the system.

FIG. 13*b* illustrates locking 31 of the system 100 in a pipe 99. In this example, the inflation of the first module 1 (the module located furthest to the right in FIG. 13*b*) enables locking 31 by direct contact of the shell 13 on the walls of the pipe 99. In a variant that is not illustrated, for f example when the pipe has large dimensions, the shell 13 of the module is not able to come into contact with the walls of the pipe. Hence, it is possible to use additional locking means, for example in the form of connecting rods, arms, or any other circular clamping means, which are activated by the change of state of the first module 1.

FIG. 13*c* illustrates a first advance 32 of the system 100 by inflation of a second module 1 (the central module in FIG. 13*c*). To do so, the second module 1 is inflated so as to switch from the elongated position into the retracted position. This change of state of the second module 1 allows, during the retraction of the module, making the system 100 advance, via a forward translational movement, and displacing the push element 17 or the incompressible sheath 14 relative to the front end of the system 100 (i.e. the end located on side of the direction of advance of the system in the figures).

FIG. 13*d* illustrates the second locking 33 of the position of the system 100 by inflation of a third module 1 (the module located furthest to the left in FIG. 13*d*). This second locking is identical to the first locking and is not therefore described again.

FIG. 13*e* illustrates the first unlocking 34 of the position of the system 100 by deflation of the first module 1 (the module located furthest to the right in FIG. 13*e*) and the second module 1 (the central module in FIG. 13*e*).

The deflation of the first and second modules enables these to return to their elongated position. In this manner, and thanks to the second locking 33, the system elongates. In other words, the system 100 advances thanks to the elongation of the first and second modules 1.

FIG. 13*f* illustrates holding 35 of the position of the system 100 until return to the first locking step 31 illustrated in FIG. 13*b*. Thus, the first module is inflated again so as to lock the system 100, which is necessary to hold the system in position in a vertical environment for example. Afterwards, the third module (the module furthest to the left in FIG. 13*f*) can be deflated so as to recover the configuration of FIG. 13*b* and restart the previously-described advance cycle.

When the advance of the system is no longer desired, all it needs, at the end of an advance cycle, is to unlock 36 the position of the system 100 by deflation of the first and third modules 1 (the modules located at the centre and furthest to the left in FIGS. 13*a* to 13*f*) in order to recover the situation illustrated in FIG. 13*a*.

Thus, this succession of steps enables the system 100 to advance/move forwards within the pipe 99.

In the illustrated example, the first module is that one located at the outlet of the push element 17 or of the incompressible sheath 14, i.e. that one located at the front of the system 100 depending on the direction of movement/push (that one located to the right in FIGS. 13*a* to 13*f*). The third module is that one located at the rear of the system 100 depending on the direction of movement/push of the push element 17 or of the incompressible sheath 14 (that one located to the left in FIGS. 13*a* to 13*f*). Hence, the second module is that one located between the first and third modules.

Furthermore, the modules 1 of the system 100 are selected from among the second (FIGS. 2*a* and 2*b*) and third (FIGS. 3*a* and 3*b*) embodiments invention. In particular, the first module 1, located at the front of the system 100 (that one located furthest to the right in 13*a* to 13*f*), and the third module 1, located at the rear of the system 100 (that one located furthest to the left in 13*a* to 13*f*), are a module 1 according to the second embodiment, meaning that they do not have a push element. The second module 1, so-called the intermediate module, located between the first and third modules 1 of the system 100, is a module 1 in accordance with the third embodiment, meaning that it has a push element 17 or an incompressible sheath 14 mounted in abutment within the second module 1. this push element 17 or this incompressible sheath 14 is capable of crossing the first module 1.

Although not illustrated, the advance function may also be obtained with modules 1 comprising an accessory element 18 crossing all of the modules. This accessory element could allow rotating a tool or any other piece of equipment, without resorting to power conversion devices such as pneumatic, hydraulic or electric motors as described in detail before. The implementation of an accessory element does not change the previously-described kinematics.

Other Aspects and Variants of the Invention

The flexible sheath 14 may be in the form of a corrugated hose, a coiled spring sheath, a tube made of silicone, a sealed spring or a retractable hose, for example.

Moreover, the implementation, in a through-passage 15 of a module 1 according to the invention, of a pull or torsion cable or of a crank-connecting rod mechanism, and in particular when they are off-centred, allow obtaining an asymmetric inflation of the module so as to ensure a curvilinear inflation of the module. Indeed, the cable or the crank-connecting rod mechanism allows constraining the muscle in one direction so as to oblige it to bend when it inflates.

The invention is described in connection with the field of robotics applied to pipe robots and in particular the applications requiring rotating a tool or any other piece of equipment, without resorting to power conversion devices such as pneumatic, hydraulic or electric motors.

Nonetheless, it should be understood that the module, the system, or even the methods of use of this system, could be applied to any field requiring a force and/or translational movement transmission and possibly requiring a flexible actuator including one or more through-passage(s) to implement any type of pneumatic, hydraulic, electrical, signal transmission accessories, or any combination of these elements.

In a variant of the invention (not illustrated), a system comprising at least two modules of the invention may be used to transmit an axial translational movement, generated by the inflation of the external membrane, to the inner sheath 14 and to the accessories 18 which it could contain in order to make a module for pulling the accessory by pinching it. Such a function may be obtained by deformation of the internal sheath (compressible in this example) under the pressure of the inflation chamber of the muscle or bladder.

The invention claimed is:

1. A module forming a mechanical actuator, a muscle or fluidic bladder type, capable of being implemented on a robot, said module comprising:

- first and second sealed end couplings provided with at least one fluid supply element,
- a flexible shell arranged between said first and second end couplings, said flexible shell being capable of deforming between an inflated state, when an inflation fluid is introduced into said shell and a deflated state, when said inflation fluid is discharged from said shell, a switch from one state to another of said shell transmitting a force and/or a translational movement of the first end coupling relative to the second end coupling;
- at least one flexible sheath in the form of a tube, arranged inside said shell and opening at the end connectors, forming at least one through-passage extending longitudinally through said module,
  - said at least one flexible sheath being fluid-tight and forming, with said shell and said end connectors, an inflation chamber into which said inflation fluid is introduced,
  - said at least one flexible sheath being in the form of a corrugated hose to allow said module, in the deflated state of the flexible shell, to bend to allow passage of pipe elbows; and
- at least one auxiliary sleeve arranged between said first and second end couplings and extending into said shell.

2. The module according to claim 1, wherein said at least one sheath is configured to resist crushing due to pressure of said inflation fluid when the fluid is injected into said chamber.

3. The module according to claim 1, wherein said through-passage is configured to receive at least one accessory element fixed or movable in translation and/or in rotation.

4. The module according to claim 3, wherein said accessory element is selected from among:

- a rotary torsion cable capable of transmitting power to a tool;
- a high-pressure or very-high-pressure hydraulic hose;
- a pneumatic hose;
- an electric power supply cable;
- a data transmission cable;
- a mechanical pull cable;
- a rigid or flexible axis which is fixed or rotary,
- a push element of another module; or
- a combination thereof.

5. The module according to claim 1, wherein said through-passage is configured to receive an incompressible push element, said push element being fixed at least in translation with respect to one of said end couplings and movable at least in translation through the other one of said end couplings so as to transmit a translational movement and/or a force during the switch from one state to another of said shell.

6. The module according to claim 5, wherein said incompressible push element is hollow so as to have a central passage, said central passage being configured to receive said at least one accessory element.

7. The module according to claim 1, wherein said at least one auxiliary sleeve is configured to receive or constitute at least one among:

- a rotary torsion cable, capable of transmitting a power to a tool;
- a high-pressure or very-high-pressure hydraulic hose;
- a pneumatic hose;
- an electric power supply cable;
- a data transmission cable;
- a mechanical pull cable;
- a combination thereof.

8. The module according to claim 1, wherein the module comprises at least one sheath and at least one auxiliary sleeve arranged between said at least one sheath and said shell.

9. The module according to claim 8, wherein the module comprises at least three auxiliary sleeves arranged substantially equidistant between said sheath and said shell.

10. The module according to claim 1, wherein said module comprises at least one intermediate element clasping said shell and said at least one sheath, said at least one intermediate element forming an element for guiding said sheath during the switch from one state to another of said shell.

11. The module according to claim 1, wherein at least one of said at least one sheath arranged inside said shell and opening at the end connectors comprises, at each of the end connectors, a check valve.

12. A system comprising:

- at least a first module and a second module, wherein each of the first and second modules forms a mechanical actuator, a muscle or fluidic bladder type, capable of being implemented on a robot, and comprises:
  - first and second sealed end couplings provided with at least one fluid supply element,
  - a flexible shell arranged between said first and second end couplings, said flexible shell being capable of deforming between an inflated state, when an inflation fluid is introduced into said shell and a deflated state, when said inflation fluid is discharged from said shell, a switch from one state to another of said shell transmitting a force and/or a translational movement of the first end coupling relative to the second end coupling;
  - at least one flexible sheath in the form of a tube, arranged inside said shell and opening at the end connectors, forming at least one through-passage extending longitudinally through said module,
    - said at least one flexible sheath being fluid-tight and forming, with said shell and said end connectors, an inflation chamber into which said inflation fluid is introduced,
    - said at least one flexible sheath being in the form of a corrugated hose to allow said module, in the deflated state of the flexible shell, to bend to allow passage of pipe elbows; and at least one auxiliary sleeve arranged between said first and second end couplings and extending into said shell; and means for assembling the first module with the second module, said first and second modules being arranged in series.

13. The system according to claim 12, wherein at least the first module comprises a push element capable of passing through at least the second module, adjacent to said first module, so as to transmit a force and/or a translational movement when changing the state of said first module.

14. A method comprising:

using a system comprising at least a first module and a second module, wherein each of the first and second modules forms a mechanical actuator, a muscle or fluidic bladder type, capable of being implemented on a robot, and comprises:

first and second sealed end couplings provided with at least one fluid supply element, a flexible shell arranged between said first and second end couplings, said flexible shell being capable of deforming between an inflated state, when an inflation fluid is introduced into said shell and a deflated state, when said inflation fluid is discharged from said shell, a switch from one state to another of said shell transmitting a force and/or a translational movement of the first end coupling relative to the second end coupling;

at least one flexible sheath in the form of a tube, arranged inside said shell and opening at the end connectors, forming at least one through-passage extending longitudinally through said module, said at least one flexible sheath being fluid-tight and forming, with said shell and said end connectors, an inflation chamber into which said inflation fluid is introduced, said at least one flexible sheath being in the form of a corrugated hose to allow said module, in the deflated state of the flexible shell, to bend to allow passage of pipe elbows; and at least one auxiliary sleeve arranged between said first and second end couplings and extending into said shell; and means for assembling the first module with the second module, said first and second modules being arranged in series, wherein the using comprises a pushing cycle comprising:

locking a position of the system with respect to an element external to the first and second modules during inflation of the first module; and displacing the push element relative to an element external to the first and second modules by inflation of the second module.

* * * * *